G. E. NYSTROM.
EGG CRATE GUARD.
APPLICATION FILED JAN. 7, 1914.
1,103,819.
Patented July 14, 1914.
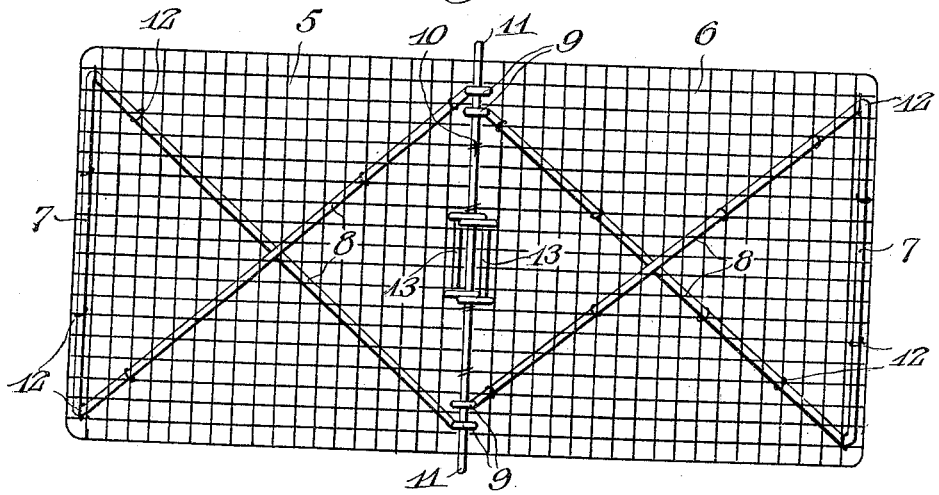
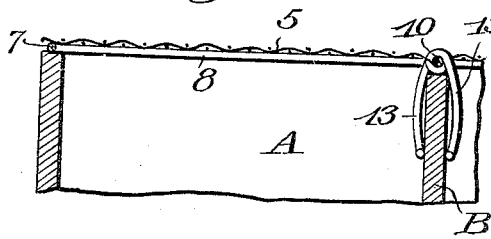
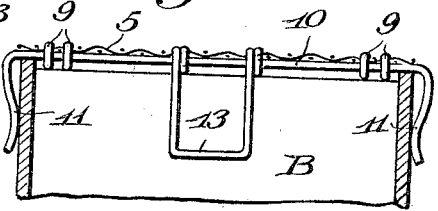
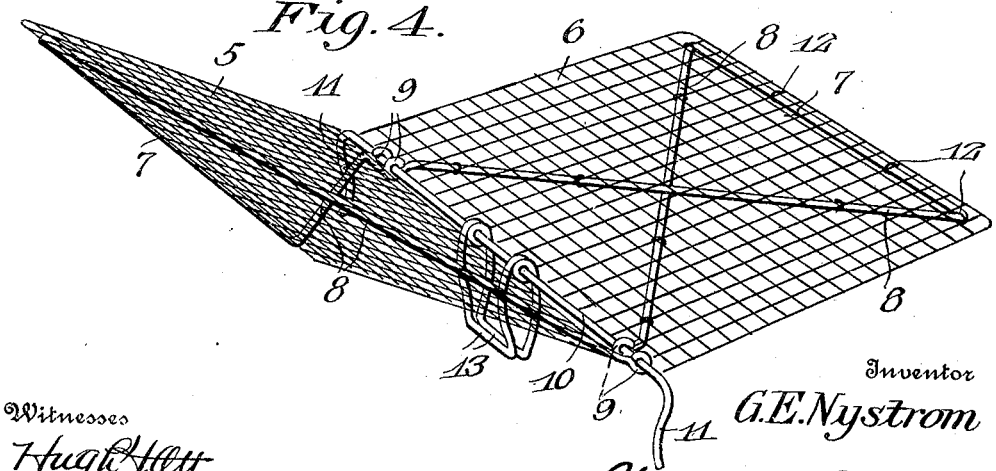
Witnesses
Hugh H. Ott
F. O. Parker
Inventor
G. E. Nystrom
By Victor J. Evans
Attorney

UNITED STATES PATENT OFFICE.

GUSTAV E. NYSTROM, OF BROOKLYN, NEW YORK.

EGG-CRATE GUARD.

1,103,819.  Specification of Letters Patent.  Patented July 14, 1914.

Application filed January 7, 1914. Serial No. 810,885.

*To all whom it may concern:*

Be it known that I, GUSTAV E. NYSTROM, a citizen of the United States, residing at Brooklyn, in the county of Kings and State of New York, have invented new and useful Improvements in Egg-Crate Guards, of which the following is a specification.

The invention relates to guards, and more particularly to the class of egg crate guards. The device is primarily intended for use to prevent articles dropping within a crate containing eggs so as to avoid the breaking of the same when the crate is placed in a store for the barter or vending of the eggs.

Another object of the invention is the provision of a crate which is readily adapted to be placed on the top of an egg crate so as to avoid the possibility of the theft of the eggs therefrom when on display within the crate.

A further object of the invention is the provision of a crate of this character which is extremely simple in construction, strong, durable, enabling convenient access to the crate for the removal of eggs therefrom, and also which is inexpensive in manufacture.

With these and other objects in view, the invention consists in the construction, combination and arrangement of parts as will be hereinafter fully described, illustrated in the accompanying drawing, and pointed out in the claim hereunto appended.

In the drawing:—Figure 1 is a top plan view of an egg crate showing the guard constructed in accordance with the invention applied. Fig. 2 is a vertical longitudinal sectional view thereof. Fig. 3 is a transverse sectional view. Fig. 4 is a perspective view of the guard with one of the sections raised.

Similar reference characters indicate corresponding parts throughout the several views in the drawing.

Referring to the drawing in detail, A designates an egg crate of the ordinary well-known construction, having the central partition B, and upon the top of this crate is mounted a guard hereinafter fully described.

The guard comprises wire mesh sections 5 and 6 respectively, the same being superimposed upon wire frames 7, the sections being of a size to cover the entire top area of the crate A when applied thereto. The frame sections are formed with cross limbs 8, the ends of which are formed with eyes 9 through which is passed a rod 10 forming a pivot for swingingly connecting the frames together. This rod 10 is formed with downturned resilient end fingers 11 which frictionally engage the sides of the crate A to hold the guard thereon when superimposed upon the same. The sections 5 and 6 are connected to the frames 7 by means of tie wires 12, or otherwise.

Carried centrally on the rod 10 are outwardly bowed oppositely arranged substantially U-shaped spring clamps 13 which are adapted to frictionally engage opposite faces of the partition B when the guard is placed upon the crate A so as to hold the guard in proper position thereon. Either section 5 or 6 of the guard can be raised when mounted upon the top of the crate so that access can be had thereto for the removal of the eggs or the contents of the crate. These sections 5 and 6 normally rest upon the top edge of the crate to close the same and thereby prevent articles falling within the crate, which would result in the breaking of the eggs or other contents thereof, and also avoid the possibility of the theft of the same.

From the foregoing it is thought that the construction and manner of use of the invention will be clearly understood, and therefore a more extended explanation has been omitted.

What is claimed is:—

A guard for egg crates comprising reticulated sections, frames connected thereto and having eye terminals, a rod passed through the eye terminals for pivotally connecting the frames, resilient fingers at the ends of the rod for engagement with the sides of the crate, and clamps supported medially on the rod for engagement with a partition within the crate.

In testimony whereof I affix my signature in presence of two witnesses.

GUSTAV E. NYSTROM.

Witnesses:
  JOHN NYSTROM,
  MARTHA LAMOREAUX.

Copies of this patent may be obtained for five cents each, by addressing the "Commissioner of Patents. Washington, D. C."